April 16, 1929.  T. SHIPLEY  1,709,751
DETACHABLE PIPE CONNECTION
Filed Jan. 26, 1926
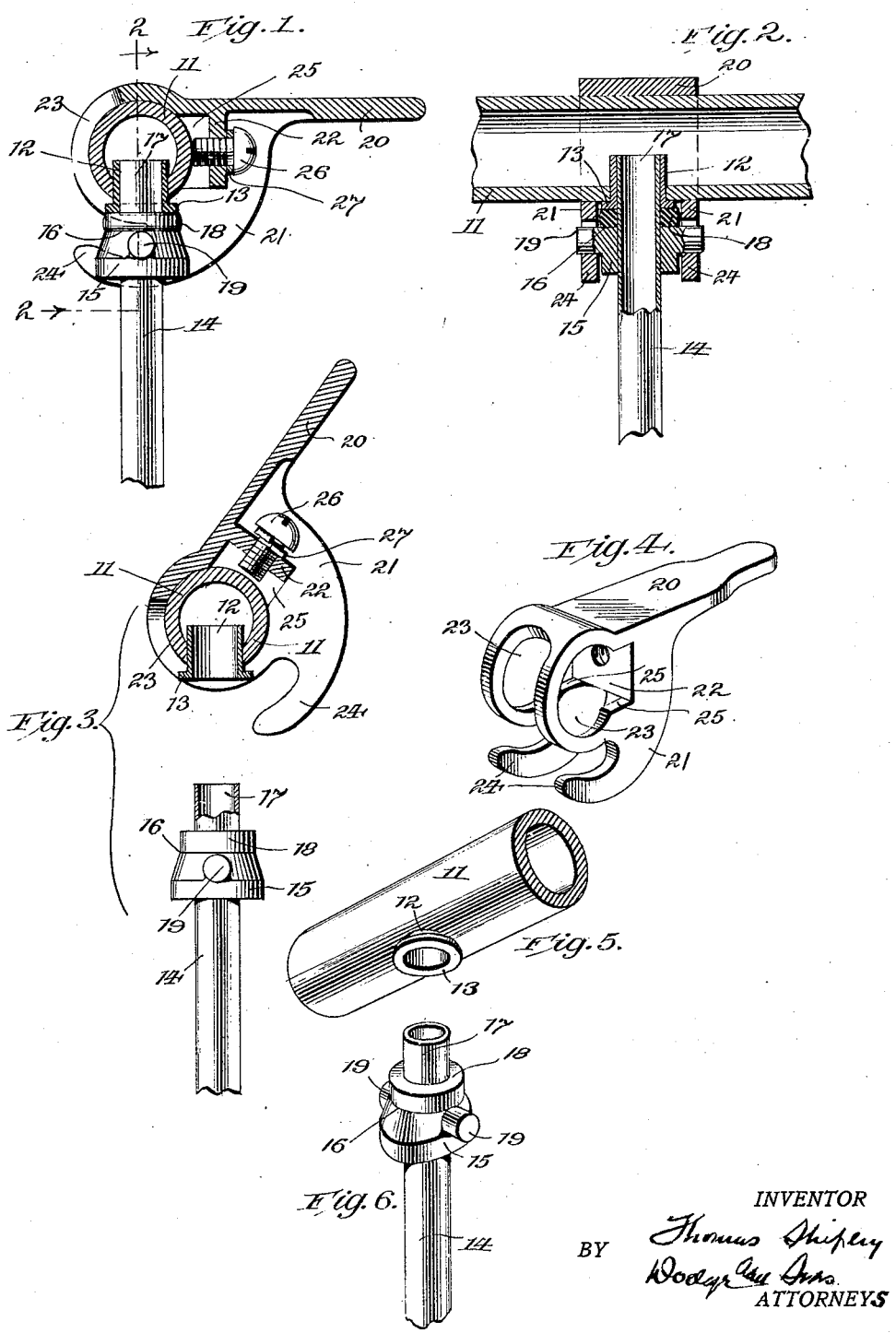
INVENTOR
Thomas Shipley
BY
ATTORNEYS Patented Apr. 16, 1929.

1,709,751

UNITED STATES PATENT OFFICE.

THOMAS SHIPLEY, OF YORK, PENNSYLVANIA, ASSIGNOR, BY MESNE ASSIGNMENTS, TO YORK ICE MACHINERY CORPORATION, OF YORK, PENNSYLVANIA, A CORPORATION OF DELAWARE.

DETACHABLE-PIPE CONNECTION.

Application filed January 26, 1926. Serial No. 83,935.

This invention relates to detachable pipe couplings, and particularly to couplings between a header and a branch pipe.

In certain types of can ice plants, using raw water it is usual to agitate the water in the cans by means of air discharged from a so called "drop pipe" inserted in each can and extending to near the bottom thereof. As the water in the can freezes solid, the drop pipe is frozen in and hence must be readily detachable from the supply, so that it may be disconnected to permit the can to be "pulled" and taken to the dump. After the can is pulled and before it is dumped the drop pipe is released by use of a "thawing needle" which is inserted into the pipe.

The object of the present invention is to provide a readily releasable tight joint between a removable air lateral, laid over the top of a row of cans in the brine tank, and each over a series of drop pipes corresponding to successive cans of the row. Thus assuming the drop pipes to be connected to the lateral and frozen in their respective cans, the lateral may be released from the drop pipe and removed, after which the cans may be pulled individually or in groups. After the cans have been refilled with water and reinserted in the tank, the lateral and drop pipes are connected up as before.

Generally stated the device includes a series of projecting nipples on the lateral, one for each drop pipe; drop pipes having flanges with gaskets mating with the nipples; and clamping cam members swiveled on the lateral and each engageable with a portion of a corresponding drop pipe to retain the drop pipe flange and gasket under sealing pressure against the corresponding nipple. An important feature of the invention is the formation of the clamping cam member in such a way that it is releasably retained by the nipple so that it is normally capable of rotary swiveling motions only.

The preferred embodiment of the invention is illustrated in the accompanying drawing, in which;

Fig. 1 is a view of the coupling partly in elevation and partly in section transverse to the lateral on the axis of a drop pipe. This view shows the parts in coupled relation.

Fig. 2 is a section on the line 2—2 of Fig. 1.

Fig. 3 is a view similar to Fig. 1 showing the parts in uncoupled relation.

Fig. 4 is a perspective view of the clamping cam, removed from the lateral.

Fig. 5 is a perspective view of a portion of the lateral, showing a nipple.

Fig. 6 is a perspective view of the mating portion of the drop pipe.

A portion of the lateral is shown at 11. On its lower side it is provided with a nipple consisting of a tubular body 12 which extends into the interior of the pipe 11, and has a flange 13 at its outer end, intended to offer an extended seating face for the gasket, later to be described. The nipple is sweated or otherwise fixed in the lateral so as to form a tight joint therewith. Only one nipple is illustrated, but the number obviously would correspond to the number of drop pipes to be connected with the lateral.

The drop pipe is shown at 14 and has a head 15 formed with a sealing face or shoulder 16 near to but below its upper end. There is thus a portion 17 of the drop pipe which extends beyond the shoulder 16. In the coupled condition this portion 17 enters the tubular body 12 of the nipple and preferably has a close sliding fit therewith. Frictionally retained on the portion 17 and seated against shoulder 16 is a gasket 18, of rubber or the like. The head 15 carries two projecting lugs 19 which are engaged by the clamping cam.

The clamping cam includes a handle member 20 by means of which it is manipulated, and a pair of spaced flanges 21 thereon, connected by a web 22. Each flange 21 is provided with an eye 23 and a cam hook 24 of generally spiral form. The flanges 21 straddle the nipple flange 13 and the eyes fit the lateral 11 so that the clamping cam may swivel thereon. Each eye has however, a recess 25 adjacent to web 22, so shaped that in one position the eyes may be slipped longitudinally on the lateral pipe 11 and over a nipple, or a series of nipples. This permits ready assembling of the clamping cams on the lateral pipe after the nipples are in place.

To prevent accidental removal of a clamping cam a stop screw 26 is threaded in web 22 and locked by a spring washer 27. The end of this screw projects into the recess 25, so that it collides with flange 13 on the nipple. It thus prevents turning of the clamping cam to such position that recess 25 will aline with the projecting end of the nipple, and hence prevents removal of the cam.

The drop pipe is connected with the lateral by inserting portion 17 into body 12 of the nipple with lugs 19 parallel with lateral pipe 11. The handle 20 is then shifted to cause cam hooks 24 to engage lugs 19. The hooks 24 are of such spiral or equivalent form that they draw the parts together progressively as the clamping cam is rotated. A reverse manipulation of the handle 20 releases the connection.

By backing out the screw 26 the clamping cam is rendered free to rotate to such position that recess 25 alines with the nipple. It may then be removed.

The device is inexpensive to construct, simple to manipulate and durable, and produces a tight joint. For use on drop pipes it has special advantages because of quick disconnection and the fact that the end of the drop pipe is free and unobstructed so that a thawing needle may readily be inserted.

What is claimed is:

1. The combination of a pipe having a lateral nipple; a branch pipe having portions adapted to enter into telescoping relation with said nipple and into sealing engagement with the end of said nipple; and a clamp having a portion surrounding and swiveled on the first named pipe and having a cam-like member adapted to engage said branch pipe and draw it into sealing engagement with said nipple as said clamp is rotated on the first named pipe.

2. The combination of a pipe having a projecting lateral nipple; a branch pipe having a portion adapted to mate with said nipple; a clamp swiveled on the first named pipe, and operable to engage said branch pipe and clamp the same, said clamp normally straddling and being retained in place by said nipple, but having a recess permitting withdrawal over the nipple in one position; and a removable stop normally preventing motion of said clamp to the position last named.

In testimony whereof I have signed my name to this specification.

THOMAS SHIPLEY.